H. LENTZ.
UNIVERSAL COUPLING.
APPLICATION FILED AUG. 20, 1909.
949,189. Patented Feb. 15, 1910.
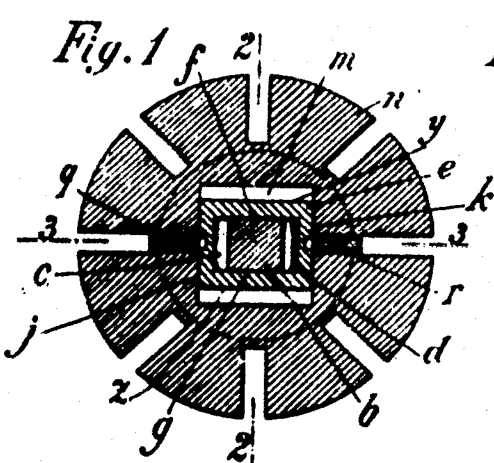
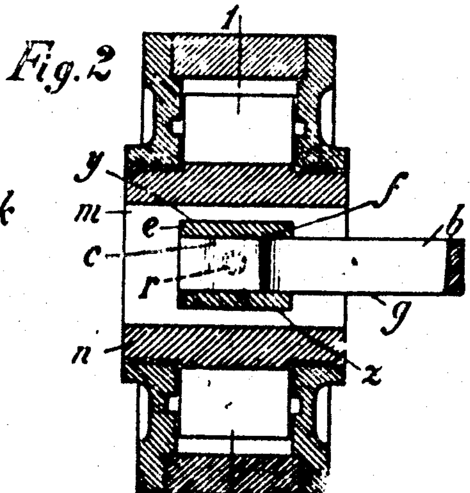
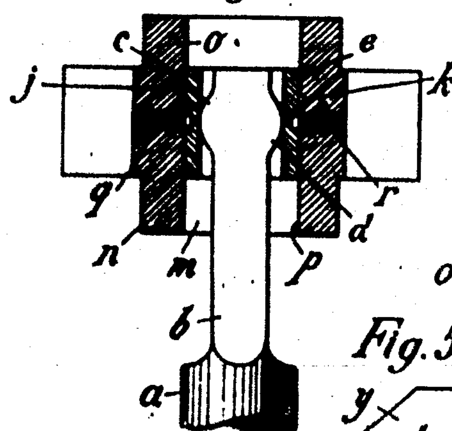
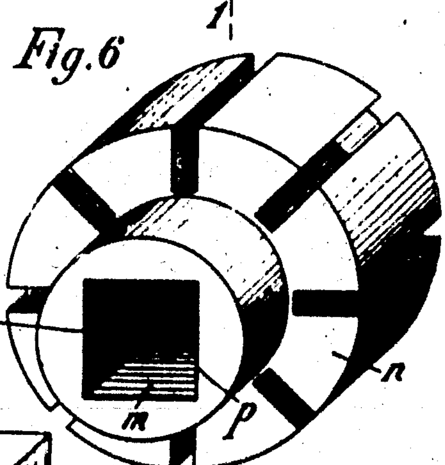
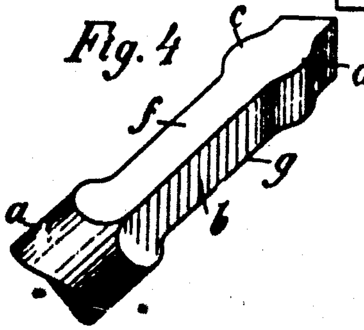
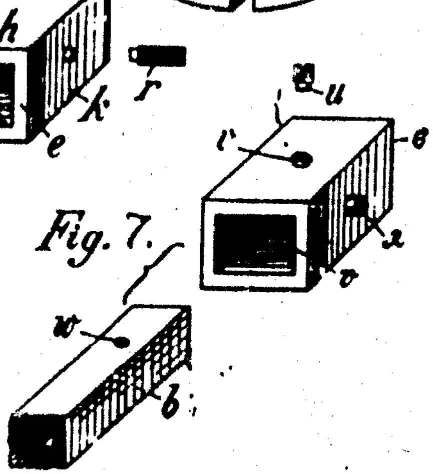
WITNESSES:
INVENTOR
HUGO LENTZ,
by
Attorney.

UNITED STATES PATENT OFFICE.

HUGO LENTZ, OF MANNHEIM, GERMANY.

UNIVERSAL COUPLING.

949,189. Specification of Letters Patent. Patented Feb. 15, 1910.

Application filed August 26, 1909. Serial No. 514,740.

*To all whom it may concern:*

Be it known that I, HUGO LENTZ, a subject of the German Emperor, and residing at Mannheim, Germany, have invented a new and useful Universal Coupling; and I do hereby declare the following to be a full, clear, and exact description of the same.

This invention relates to universal couplings, and the object thereof is to reduce the strain on the parts of the coupling, while permitting the parts thereof to be mutually inclined and to have a longitudinal displacement, and a further object is to permit the ready assembling and taking apart of the device.

In the forms of the invention shown in the drawings, I attain said objects by the employment of a bush or an intermediate member which is in engagement with two members each having two parallel surfaces, the surfaces of one member being at right angles to those of the other member.

By the present invention, it is easily possible to couple a rotary piston, or other rotary member having a comparatively small opening at its axis of rotation, by means of my new universal joint, and to transmit great power.

The construction of the new coupling is exceedingly simple and economical. The coacting surfaces may operate correctly before the parts are put together, while, in constructions heretofore known, the journals must be carefully turned out and in pairs. As contrasted with prior couplings, my construction requires much less room, and permits comparatively large journal pressures to be distributed over a large area, so that the pressure is substantially small at any given point.

In the accompanying drawings I show, diagrammatically, a form of coupling heretofore usually employed, and I also show two embodiments of my invention.

Figure 1 is a section (on line 1—1 of Fig. 2) showing the employment of a bush and a shaft with a rotary piston; Fig. 2 is a section of a rotary engine (at the line 2—2 of Fig. 1), the casing being shown; Fig. 3 is a section at about the line 3—3 of Fig. 1; Fig. 4 is a perspective view of the shaft; Figs. 5 and 6 are like views of the bush and of the rotary piston; and Fig. 7 represents, in perspective, the parts, ready to be assembled, of a modified form of my invention.

Referring to the parts shown in Figs. 1–6, the shaft *a* has its end *b* provided with flattened sides, two opposite surfaces (*f* and *g*) thereof being formed parallel. It is also provided at the other opposite surfaces with symmetrically-arranged and rounded swells (*c*, *d*). A rotary piston *n* is provided with a centrally-located rectangular opening (*m*), said opening having parallel surfaces (*o* and *p*). Into this opening, I fit a hollow bush (*e*) having opposite outer surfaces (*j* and *k*) flat and in movable and non-rotatable contact with the surfaces *o* and *p* aforesaid, but otherwise free of the inner walls of the opening *m* of the piston. Said bush is pivotally connected with the piston by means of two pivots at right angles to the surfaces *j* and *k*, and, for this purpose, I may use screws *q* and *r* screwed into holes drilled through the hollow piston at the bottom of vane-guiding slots. The squared end of the shaft *b* is inserted into the bush, the parallel surfaces (*f* and *g*) of said end being in movable and non-rotatable contact with inner walls or parallel surfaces (*h* and *i*) of the bush, but otherwise free of the inner walls of the bush except at outer parts of the swells *c* and *d* which touch the remaining inner walls of said bush. The parallel inner surfaces *p* and *o* of the piston coincide with the parallel outer surfaces of the bush, and are, it will be noticed, at right angles to the parallel inner surfaces *h* and *i* of the latter, which coincide with the surfaces *f* and *g* of the shaft end.

Examination of the drawings will show, that the piston and bush must rotate together (the latter having a pivotal engagement with the piston), and that the bush and shaft end must also rotate together (the shaft end having a slight slidable movement in the bush, and also having a pivotal engagement with the latter, by reason of the opposite swells *c* and *d*). It will further be noticed that the contacting areas between the shaft end and the surrounding bush are flat and quite large, while the contacting areas between the bush and the inner surfaces (*o* and *p*) of the piston (which houses the bush) are also flat and quite large. Both of these circumstances, cause a wide distribution of the strains due to the operation of the parts while contributing great strength.

In assembling the coupling, it is necessary only to slide the parts together, and to turn the screws *r* and *q*. The separation of the parts is equally simple.

According to the modification shown in Fig. 7 of my invention, the connection between the bush *e* and the shaft end *b* may be a firm one, and the bush may be longitudinally displaced with the shaft in the hub of the piston *n*. In such a case, the bush may have an opening *r* in its upper side (and a like opening in the bottom side) for the reception of a pin *u*, the smooth end of which pin engages in an aperture *w* in the shaft end. In order to provide for necessary longitudinal displacement of the parts, the bush may have, at each side, a pin *x*, to slide in longitudinal grooves in the recess *m* of the piston.

What I claim is:

1. A universal coupling comprising two members, capable of rotation about axes at an angle with respect to each other and each having two parallel surfaces, the parallel surfaces of one of said members being at right angles to those of the other member, in combination with an intermediate member which has a pivotal engagement with each of the aforesaid members, at right angles with respect to the adjacent pair of parallel surfaces of the latter.

2. A universal coupling comprising an outer member and an inner member capable of rotation about axes at an angle with respect to each other and each having two parallel surfaces, the parallel surfaces of the outer member being at right angles to those of the inner member, in combination with a bush in the outer member and around the inner one, said bush having a pivotal engagement with each member and having parallel surfaces closely fitting those of both members.

3. A universal coupling comprising an outer member and an inner member capable of rotation about axes at an angle with respect to each other, in combination with a bush in the outer member and around the inner one, said bush having a slidable and non-rotatable engagement with one of said members, a pivotal engagement with one member and a pivotal engagement, at right angles to that aforesaid, with the other member.

4. A universal coupling comprising two members capable of rotation about axes at an angle with respect to each other, and each having two parallel surfaces, the parallel surfaces of one of said members being at right angles to those of the other member, in combination with an intermediate member having two pairs of parallel surfaces, one fitting those of one member first-named and the other pair of parallel surfaces fitting those of the other of the first-named members.

5. In combination, a rotatable member having a hollow therein provided with parallel surfaces, a bush in said hollow and having parallel outer surfaces in contact with those first named and also having parallel inner surfaces at right angles to its outer surfaces, and a shaft having an end portion provided with parallel outer surfaces in contact with the aforesaid parallel inner surfaces of the bush.

In testimony whereof, I have signed my name to this specification in the presence of two subscribing witnesses.

HUGO LENTZ.

Witnesses:
C. FREUNZ,
ERNEST L. IVES.